(12) United States Patent
MacFarlane Shearer, III et al.

(10) Patent No.: US 7,088,958 B2
(45) Date of Patent: Aug. 8, 2006

(54) REMOTE POWER AMPLIFIER LINEARIZATION

(75) Inventors: Daniel Davidson MacFarlane Shearer, III, Scottsdale, AZ (US); Ronald Duane McCallister, Scottsdale, AZ (US)

(73) Assignee: Intersil Americas Inc., Irvine, CA (US)

( * ) Notice: Subject to any disclaimer, the term of this patent is extended or adjusted under 35 U.S.C. 154(b) by 847 days.

(21) Appl. No.: 09/884,000

(22) Filed: Jun. 19, 2001

(65) Prior Publication Data

US 2002/0193078 A1    Dec. 19, 2002

(51) Int. Cl.
*H04B 7/00*    (2006.01)

(52) U.S. Cl. ............................. 455/69; 455/92; 455/522

(58) Field of Classification Search ............... 455/63.1, 455/67.13, 501, 114.2, 126, 522, 68, 92, 69
See application file for complete search history.

(56) References Cited

U.S. PATENT DOCUMENTS

| | | | | |
|---|---|---|---|---|
| 5,049,832 A | | 9/1991 | Cavers | 330/149 |
| 5,157,346 A | | 10/1992 | Powell et al. | 330/151 |
| 5,237,288 A | * | 8/1993 | Cleveland | 330/107 |
| 5,420,536 A | * | 5/1995 | Faulkner et al. | 330/149 |
| 5,524,285 A | * | 6/1996 | Wray et al. | 455/126 |
| 5,559,807 A | * | 9/1996 | van den Heuvel et al. | 370/347 |
| 5,694,433 A | * | 12/1997 | Dent | 375/297 |
| 5,722,056 A | | 2/1998 | Horowitz et al. | 435/126 |
| 5,732,333 A | | 3/1998 | Cox et al. | 455/126 |
| 5,760,646 A | | 6/1998 | Belcher et al. | 330/149 |
| 5,778,029 A | | 7/1998 | Kaufmann | 375/296 |
| 5,818,867 A | | 10/1998 | Rasmussen et al. | 375/200 |
| 5,819,165 A | | 10/1998 | Hulkko et al. | 455/126 |
| 5,867,065 A | | 2/1999 | Leyendecker | 330/149 |
| 5,912,588 A | * | 6/1999 | Nummila | 330/254 |
| 5,959,499 A | | 9/1999 | Kahn et al. | 330/149 |
| 6,035,181 A | | 3/2000 | Gross | 455/127 |
| 6,041,088 A | | 3/2000 | McCallister | 375/358 |
| 6,043,712 A | * | 3/2000 | Leizerovich et al. | 330/279 |
| 6,049,703 A | * | 4/2000 | Staudinger et al. | 455/114.3 |
| 6,075,412 A | * | 6/2000 | Bainvoll | 330/149 |
| 6,125,266 A | | 9/2000 | Matero et al. | 455/126 |
| 6,151,368 A | | 11/2000 | Cochran | 375/326 |
| 6,154,510 A | | 11/2000 | Cochran et al. | 375/371 |

(Continued)

OTHER PUBLICATIONS

"An Automatically Controlled Predistorter for Multilevel Quadrature Amplitude Modulation", © 1983 IEEE, pp. 707-712.

(Continued)

*Primary Examiner*—Bing Q. Bui
(74) *Attorney, Agent, or Firm*—Meschkow & Gresham, P.L.C.

(57) ABSTRACT

A communication system (20) includes a hub radio (22) that wirelessly communicates with any number of user radios (24). The hub radio (22) monitors signal quality measurements compiled from the communication signals (30') transmitted from the various user radios (24) and based upon baseband quadrature constellation point error to estimate out-of-band signal energy for the communication signals (30'). The hub radio (22) formulates commands based upon these measurements that instruct the user radios (24) how to adjust their power amplifier linearizers (66) so that their power amplifiers (74) become better linearized to minimize spectral regrowth and insure compliance with a spectral template.

26 Claims, 6 Drawing Sheets

U.S. PATENT DOCUMENTS

| | | | |
|---|---|---|---|
| 6,175,270 B1 | 1/2001 | Vannucci | 330/2 |
| 6,191,653 B1 * | 2/2001 | Camp et al. | 330/129 |
| 6,212,397 B1 * | 4/2001 | Langston et al. | 455/500 |
| 6,222,878 B1 | 4/2001 | McCallister et al. | 375/225 |
| 6,246,286 B1 * | 6/2001 | Persson | 330/149 |
| 6,397,070 B1 * | 5/2002 | Black | 455/453 |
| 6,546,233 B1 * | 4/2003 | Aleiner et al. | 455/126 |
| 7,010,280 B1 * | 3/2006 | Wilson | 455/126 |

OTHER PUBLICATIONS

Applied Microwave & Wireless, "Suppress Spectral Sidelobe Regrowth With Data Signal Predistortion", by Robert A. Mozingo, and Frank Amoroso, pp. 62-70, Oct. 1998.

* cited by examiner

REMOTE POWER AMPLIFIER LINEARIZATION

TECHNICAL FIELD OF THE INVENTION

The present invention relates generally to the field of communications. More specifically, the present invention relates to the linearization of transmitter power amplifiers.

BACKGROUND OF THE INVENTION

In the field of communications, and more particularly wireless communications, a transmitter power amplifier generates a communication signal at a power level sufficient for that communication signal to be received at an intended receiver. To the extent that the power amplifier does not have a precisely linear transfer function, the communication signal will include some distortion. This distortion will adversely impact the ability of the receiver to correctly recover the information being conveyed. In digital communications, the adverse impact worsens as communication links attempt to operate at higher modulation orders and lower signal-to-noise ratios.

Moreover, this distortion introduces spectral regrowth into the communication signal. As more and more users vie for the limited electromagnetic spectrum, governmental regulations and system constraints each require communication signals to occupy as little of the spectrum as is necessary for the information being conveyed. Unfortunately, the distortion caused by power amplifier nonlinearities invariably causes the communication signal spectrum to increase.

One historical solution to the power amplifier nonlinearity problem has been to use high quality components or components otherwise restricted to operate only in a limited highly linear range of operation for the power amplifier to minimize spectral regrowth and distortion. Unfortunately, high quality components are too expensive, especially for mass market or otherwise high volume applications. Techniques that restrict operation to highly linear ranges of component operation tend to suffer from inefficient power use and are thus unsuitable for portable applications.

A more modern solution to the power amplifier nonlinearity problem has been to incorporate a power amplifier linearizer into the transmitter. In a typical digital communication application, the linearizer is implemented digitally through the use of look-up tables located upstream of the power amplifier, prior to analog conversion. The linearizer attempts to apply a particular transfer function to the signal it processes. The transfer function is desirably proportional to the inverse of the power amplifier transfer function. Thus, the linearizer predistorts a modulated signal causing the resulting communication signal, that will invariably be distorted by a power amplifier, to be as nearly perfectly linear as possible.

Several conventional techniques are known to those skilled in the art for determining a transfer function to be implemented by a linearizer and generating appropriate data to populate the look-up-tables used by the linearizer. In a typical conventional technique, the transmitter locally monitors and analyzes the communication signal being generated by its power amplifier to determine the nature of the distortion and to track any changes in the distortion. In order to do this, demodulation circuitry is supplied in the transmitter to locally demodulate the communication signal and processing circuitry is supplied in the transmitter to locally analyze the demodulated signal, characterize the distortion, out-of-band energy, or the like, and generate the data used to populate linearizer look-up-tables.

Such conventional linearization techniques suffer from several problems. One problem is that the conventional techniques do not allow the communication system to maintain positive control over spectrum use. Typically, a sample unit of a new radio design is tested in friendly, well-controlled environmental conditions for compliance with a spectral template imposed by governmental regulations. During manufacturing, additional samples may occasionally, although typically rarely, be tested for spectral compliance. This procedure allows numerous opportunities for non-compliant radios to be used by the general public. For example, some radio designs may be non-compliant when used over a range of environmental conditions. In accordance with other radio designs, some radios may be compliant, while others are non-compliant simply due to the vagaries of manufacturing processes. Moreover, some radios may have been compliant at one point in time, but become non-compliant due to component aging. Furthermore, unscrupulous manufacturers of radios may select for testing only those radios likely to prove themselves compliant, may substitute lower quality components for inclusion in manufacturing process when spectral compliance testing is unlikely, and the like. Consequently, many opportunities exist for non-compliant radios to be used by members of the general public.

The use of non-compliant radios is undesirable because it leads to increased interference levels. Increased interference levels diminish the ability of a provider of communication services to provide, and gain revenues from, communication services. Non-compliant radios are also undesirable simply because they are in violation of governmental regulations. Maintaining more positive control would be desirable to communication service providers because they could then insure that their users were using spectrally efficient radios that would minimally interfere with the communication services provided to other users. More communication services could then be provided to more users because interference levels would be diminished, and revenues could increase.

Conventional linearization techniques suffer from additional problems. For example, conventional techniques drive up the complexity and costs of providing communication services, particularly in point to multipoint (PTM) communication systems. A conventional cellular voice communication system is one example of a PTM communication system. In PTM systems, a large number of user radios typically communicate with a single hub radio. The use of conventional linearization techniques at the hub radio may not increase costs an intolerable amount when viewed from a system-wide perspective because those costs are incurred at relatively few sites. On the other hand, the use of conventional linearization techniques in user radios imposes intolerable costs on a communication system because of the large number of user radios that communicate with each hub radio. This cost problem is exacerbated by what has become a traditional business practice where the communication system provider heavily subsidizes the cost of user radios.

These problems are made worse when the user radios are portable. The inclusion of additional demodulation and processing circuitry is highly undesirable in portable radios because these items increase power consumption, weight, and physical radio size.

Another problem with some conventional linearization techniques is that the transmitters are required to transmit predetermined training sequences in order for the local linearization analysis circuitry to determine a suitable linearizer transfer function. The predetermined training sequences are transmitted in lieu of user payload data for which revenues may be generated. Consequently, these conventional linearization techniques diminish a communication service provider's ability to provide communication services to users and revenues that might otherwise be generated.

SUMMARY OF THE INVENTION

It is an advantage of the present invention that an improved technique for remote power amplifier linearization is provided.

Another advantage of the present invention is that a communication system is provided where a transmitter in a user radio is remotely linearized in response to processing performed in a hub radio.

Another advantage of the present invention is that linearized user radios are provided without requiring local linearization at the user radios.

Another advantage of the present invention is that a hub radio is provided that can maintain more positive control over the spectrum used by the user radios with which it communicates.

Another advantage of the present invention is that user radios are provided that can use linearized, lower cost, power amplifiers without requiring demodulation and linearization analysis circuitry to accomplish the linearization.

Another advantage of the present invention is that a communication system is provided in which linearization analysis takes place by analyzing a received, noisy, low signal-to-noise ratio communication signal.

Another advantage of the present invention is that a hub radio is provided which includes linearization analysis circuitry and processing capabilities for a number of user radios so that user radios need not include such circuitry and processing capabilities.

These and other advantages are realized in one form by an improved hub radio for use in a communication system having remote power amplifier linearization. The hub radio includes a receiver section configured to receive a wireless communication signal and to generate a signal quality measurement that is responsive to the communication signal. A controller is configured to estimate a power amplifier linearizer transfer function in response to the signal quality measurement and to formulate a command in response to the estimated power amplifier linearizer transfer function. A transmitter section is configured to wirelessly transmit the command.

These and other advantages are realized in another form by a user radio for use in a communication system having remote power amplifier linearization. The user radio includes a power amplifier linearizer adapted to apply a transfer function to a modulated data stream and generate a linearized data stream. A power amplifier is configured to amplify the linearized data stream and generate a communication signal. A receiver section is adapted to receive commands from outside the user radio via wireless communication. A controller is coupled to the receiver and the power amplifier linearizer. The controller is configured to adjust the transfer function in response to the commands so that the power amplifier becomes remotely linearized.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
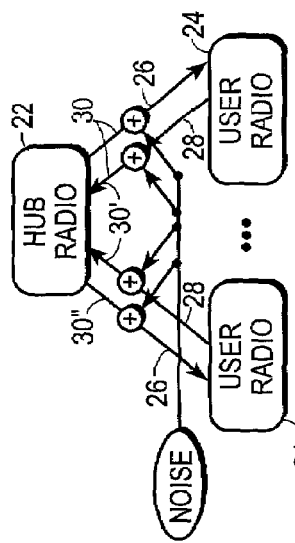
FIG. 1 shows a simplified block diagram of a point to multipoint communication system with which one embodiment of the present invention may be adapted to operate.

FIG. 1 shows a simplified block diagram of a point to multipoint communication system 20 with which one embodiment of the present invention may be adapted to operate. Communication system 20 includes a hub radio 22 and any number of user radios 24. Typically, communication system 20 will include many user radios 24 for each hub radio 22, but this is not a requirement. Hub radio 22 communicates with user radios 24 over a forward link 26 and a reverse link 28. Nothing requires user radios 24 to be able to communicate with each other. Hub radio 22 and/or user radios 24 may be mobile, portable, or stationary.

As indicated in FIG. 1, wireless communication signals 30 transmitted over forward and reverse links 26 and 28 are invariably corrupted by noise. In accordance with one embodiment of the present invention, hub radio 22 is locally linearized. In other words, a transmitter in hub radio 22 may use high quality components that do not require linearization, may include a power amplifier linearizer along with local linearization analysis circuits and processing capabilities to detect nonlinearities in a communication signal 30" transmitted from hub 22, or the like. Conventional local linearization techniques are acceptable at hub 22 because communication signal 30" when detected at hub 22 is a high signal-to-noise ratio signal that has not yet been significantly corrupted by noise. However, local linearization techniques are not suitable when applied to a communication signal 30' transmitted from user radios 24 and received at hub radio 22. At hub radio 22, received communication signals 30' are low signal-to-noise ratio signals that have been corrupted by noise. Accordingly, conventional local linearization techniques fail to provide acceptable results. However, acceptable results may be obtained through the generation of a signal quality statistic, an example of which is discussed in more detail below.

Figure 2:
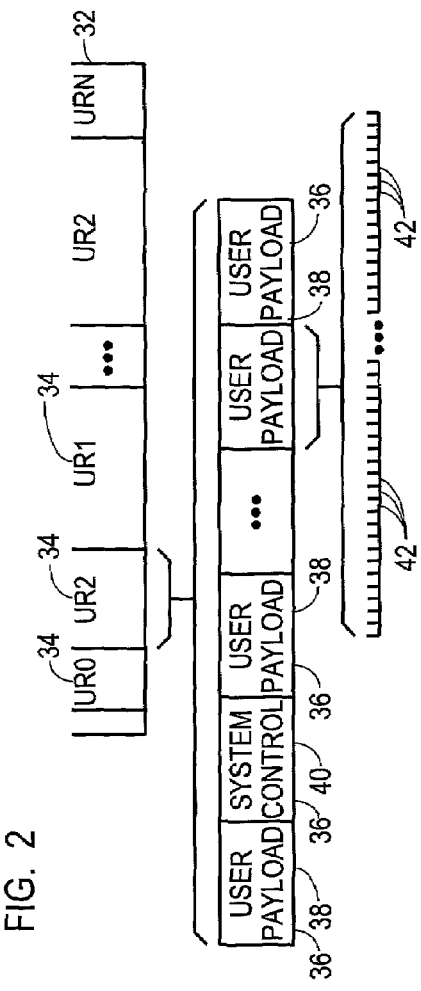
FIG. 2 shows a timing chart for a time division multiplex (TDM) communication system with which one embodiment of the present invention may be adapted to operate.

FIG. 2 shows a timing chart for a time division multiplex (TDM) communication system 20 with which one embodiment of the present invention may be adapted to operate. The timing chart of FIG. 2 may apply to communications on either forward link 26, reverse link 28, or both (FIG. 1). FIG. 2 indicates that communication system 20 may divide time into frames 32. Different time slots 34 of each frame 32 may then be assigned for use by different user radios 24 (FIG. 1). FIG. 2 references the different user radios to which time slots 34 may be assigned as: UR0, UR1, . . . URN. During a given user radio timeslot 34, data may be transmitted as packets 36 or in other groups, bunches, or other collections known to those skilled in the art.

FIG. 2 illustrates that two different types of data may be conveyed. During a timeslot 34, user payload data 38 and system control data 40 may be conveyed at different times. The purpose of communication system 20 is to convey user payload data 38. In a typical application, the nature or purpose of user payload data 38 is of little importance to the providers of communication system 20. User payload data 38 may be configured as voice, video, computer file data, computer network data, facsimile data, paging data, or the like. User payload data 38 is generated by and consumed by the users of communication system 20.

In contrast, system control data 40 represents overhead used to control the operation of communication system 20. Power level adjustments and handoff commands common in voice cellular communication systems represent two of numerous examples of possible system control data 40. Other types of control data are discussed below. System control data 40 is generated and consumed by the components of communication system 20. In accordance with one embodiment of the present invention, communication system 20 performs remote linearization of transmitters in user radios 24 (FIG. 1) while user radios 24 transmit either user payload data 38 or system control data 40. Accordingly, no more than an insignificant amount of system resources needs to be dedicated to remote linearization.

FIG. 2 also indicates that each packet 36 or other collection of data is further subdivided into a multiplicity of unit intervals 42. A unit interval 42 is the basic unit of time during which communication system 20 transmits a single symbol of data. Each symbol may convey any number of bits. For a modulation order of 16, e.g., 16-QAM, 4 bits of data are conveyed in a single symbol during a single unit interval 42, for a modulation order of 64, e.g., 64-QAM, 6 bits of data are conveyed, and so on. In accordance with a preferred embodiment, communication system 20 may accommodate a wide variety of modulation orders and types, and may alter the modulation order and type as needed from time to time.

Figure 3:
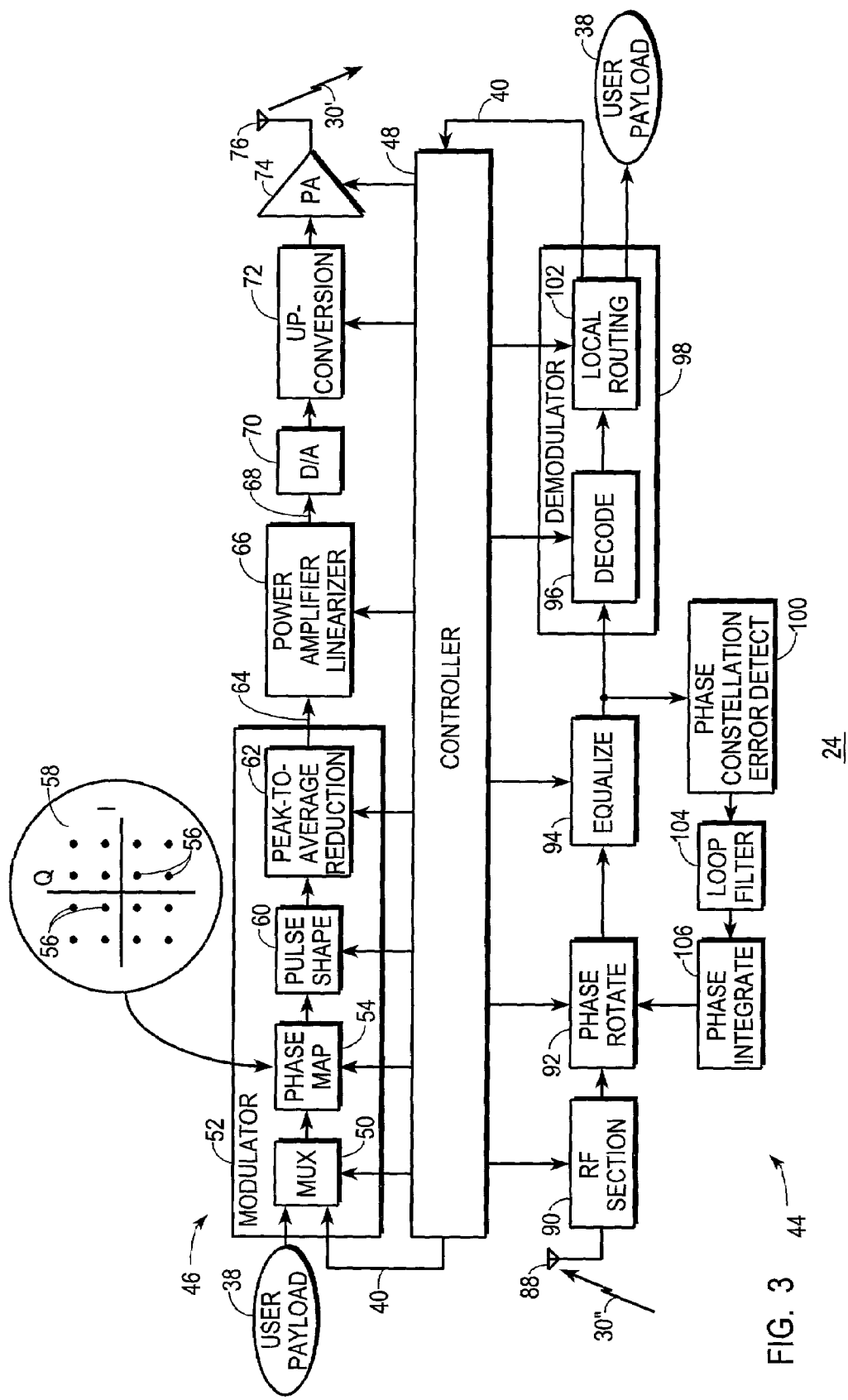
FIG. 3 shows a block diagram of a user radio configured in accordance with one embodiment of the present invention.

FIG. 3 shows a block diagram of a user radio 24 configured in accordance with one embodiment of the present invention. In the preferred embodiment, all user radios 24 may be configured substantially as depicted by FIG. 3. User radio 24 includes a receiver section 44, a transmitter section 46, and a controller 48. Transmitter section 46 receives user payload data 38 and system control data 40 at a multiplexer 50 (MUX) in a modulator 52. System control data 40 is provided by controller 48, and user payload data 38 originates from outside user radio 24 for the purposes of this discussion. However, those skilled in the art will appreciate that other components, such as audio or video digitizing components, or a computer, may be provided in a common housing with user radio 24 to generate user payload data 38.

Within modulator 52, multiplexer 50 is controlled by controller 48 to supply either user payload data 38 or system control data 40, as deemed appropriate for the operating requirements of the moment, to an input of a phase mapper 54. For each unit interval 42 (FIG. 2), phase mapper 54 converts a number of bits appropriate to the selected modulation order into a symbol, represented as a constellation point 56 selected from a constellation 58 of quadrature phase points. FIG. 3 depicts constellation 58 as implementing 16-QAM, however those skilled in the art will appreciate that 16-QAM is depicted only for convenience and that a wide variety of different constellations 58 may be implemented by phase mapper 54 and that constellation 58 may be changed from time to time under the control of controller 48.

Over time, a stream of constellation points 56 are provided by phase mapper 54 to a pulse shaping filter 60. Desirably, pulse shaping filter 60 implements a root Nyquist or other filter known to those skilled in the art to spread the energy from each constellation point 56 over several unit intervals 42 (FIG. 2) in a manner conducive to subsequent demodulation in a receiver. Pulse shaping filter 60 reduces the spectrum of signal being constructed by modulator 52. Pulse shaping filter 60 may also be controlled by controller 48 so that filter coefficients may be changed from time to time as desired.

An output of pulse shaping filter 60 is supplied to a peak-to-average amplitude reduction block 62. Block 62 reduces extreme amplitude peaks in the signal being constructed by modulator 52 so that, in addition to other reasons, a power amplifier, discussed below, need not linearly reproduce its input signal over as wide a dynamic amplitude range as would be otherwise required. Block 62 may also be controlled by controller 48 so that the amplitude reduction algorithms may be altered from time to time. Peak to average amplitude reduction block 62 generates a modulated data stream 64 that serves as the output from modulator 52.

Modulated data stream 64 is supplied to a power amplifier linearizer 66. In a manner understood to those skilled in the art, power amplifier linearizer 66 applies a particular transfer function to the signal represented by modulated data stream 64. That particular transfer function is proportional to the inverse of the transfer function of a downstream power amplifier, discussed below, as closely as possible. Linearizer 66 may be implemented using, among other components, a look-up table (not shown) to implement the linearizer transfer function. Accordingly, linearizer 66 couples to controller 48 so that controller 48 may supply the data to this look-up table and adjust this data from time to time.

Linearizer 66 provides linearized data 68 to a digital-to-analog (D/A) converter 70, which couples to an up-conversion block 72. Up-conversion block 72 may also couple to controller 48 so that controller 48 may control frequency tuning and the like. Those skilled in the art will appreciate that upstream of up-conversion block 72, the data processed in transmitter section 46 is desirably represented as complex data streams, and that the complex data streams may then be combined in up-conversion block 72 to produce a single analog signal. This analog signal is provided to an input of a power amplifier 74. Power amplifier 74 amplifies this analog signal to generate a communication signal 30', which is transmitted from user radio 24 at an antenna 76. In the preferred embodiments, an ordinary cost-effective power amplifier may be used as power amplifier 74. In other words, power amplifier 74 need not exhibit exceptional high quality which might increase expense, and power amplifier 74 need not have excess capabilities which remain unused so that operation may be restricted to a linear range.

Figure 4:
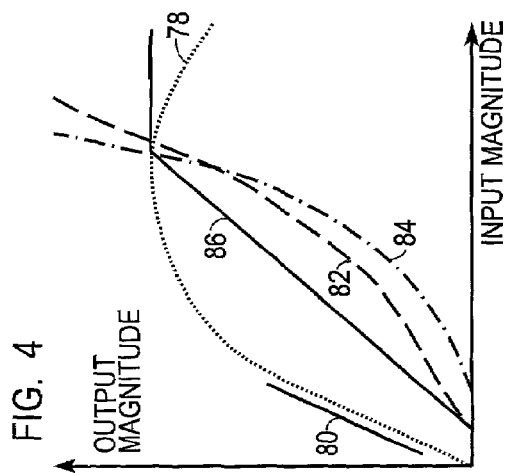
FIG. 4 shows a graph of input to output amplitude characteristics of a hypothetical power amplifier included in the user radio of FIG. 3.

FIG. 4 shows a graph depicting a trace 78 of input to output amplitude characteristics of a hypothetical power amplifier 74. Trace 78 depicts only a portion of the entire complex transfer function implemented by power amplifier 74. Without linearization, power amplifier 74 has a substantially linear range of operation 80, but that range exists at a limited input and output magnitude. Power amplifier 74 is capable of producing signal above linear range 80, but the transfer function becomes non-linear. Without linearization, operation in this non-linear range would lead to spectral regrowth and operation outside a spectral template imposed by governmental regulations, thereby causing interference for users of adjacent spectrum.

FIG. 4 also shows a trace 82 and a trace 84 depicting hypothetical linearizer transfer functions as may be implemented by power amplifier linearizer 66 (FIG. 3). The purpose of implementing linearizer transfer functions 82 or 84, as may be appropriate to a given situation, would be to cause the overall signal at the output of power amplifier 74 (FIG. 3) to exhibit as closely as possible the linear transfer function depicted in a trace 86. Linear transfer function 86 has a linear range of operation that exceeds range 80 of non-linearized power amplifier 74. When deemed necessary by a hub radio 22 (FIG. 1), commands may be issued to cause user radio 24 to adjust its linearization transfer function, such as from transfer function 82 to transfer function 84 or vice-versa. Those skilled in the art will appreciate that the complex signal processed by linearizer 66 and power amplifier 74 may exhibit other distortions than the AM/AM distortion depicted in trace 78. Such other distortions may include AM/PM distortion. Nothing prevents linearizer 66 from providing transfer functions as necessary to address these and other types of distortion.

Referring back to FIG. 3, at user radio 24 a communication signal 30" transmitted from hub radio 22 (FIG. 1) is received at an antenna 88 of receiver section 44, which may be the same as or different from antenna 76 discussed above. Antenna 88 couples to an RF section 90. RF section 90 may include RF filtering, a fixed frequency oscillator, a variable frequency oscillator, down-conversion circuits, analog pre-conditioning circuits, analog-to-digital conversion circuits, and other components conventionally included in RF sections of radio receivers. RF section 90 preferably generates an essentially baseband, digital form of signal communication signal 301" expressed as a complex data stream.

The baseband signal generated by RF section 90 is routed to a first input of a phase rotator 92. Phase rotator 92 is used to close a carrier tracking loop that allows receiver section 44 to match and track the carrier frequency used by hub radio 22 (FIG. 1). The frequency used by hub radio 22 is desirably well matched before data may be successfully extracted from communication signal 30".

The signal output from phase rotator 92 is routed to an adaptive equalizer 94. Adaptive equalizer 94 implements a digital filter which adapts itself to compensate for primarily linear distortions in the communication channel. The signal output from adaptive equalizer 94 is routed to a decoder 96 in a demodulator section 98 and to a phase constellation error detector 100. Decoder 96 extracts the conveyed data from the communication signal. Decoder 96 may implement convolutional and/or block decoding and other decoding techniques well known to those skilled in the art in extracting the data from the communication signal. Moreover, decoder 96 is desirably programmable so that it can perform decoding functions which are appropriate for a given modulation order. Such programming may be provided from controller 48.

Within demodulator 98, the data produced by decoder 96 is supplied to a local routing section 102, where user payload data 38 is routed outside user radio 24 and system control data 40 is routed to controller 48. Controller 48 is configured to act upon system control data 40 wirelessly received in receiver section 44. For example, such system control data 40 includes commands which instruct user radio 24 to adjust the transfer function implemented in linearizer 66.

Phase constellation error detector 100 is part of the carrier tracking loop. Phase constellation error detector 100 determines, for each unit interval 42 (FIG. 2), the complex difference vector between a received phase state and the nearest ideal phase state. A phase error signal output of phase constellation error detector 100 is routed to a loop filter 104 for the carrier tracking loop. A filtered phase error signal is routed from loop filter 104 to a phase integrator 106. Phase integrator 106 transforms the filtered phase error signal into a phase signal suitable for feeding back to phase rotator 92 to close the carrier tracking loop.

Figure 5:
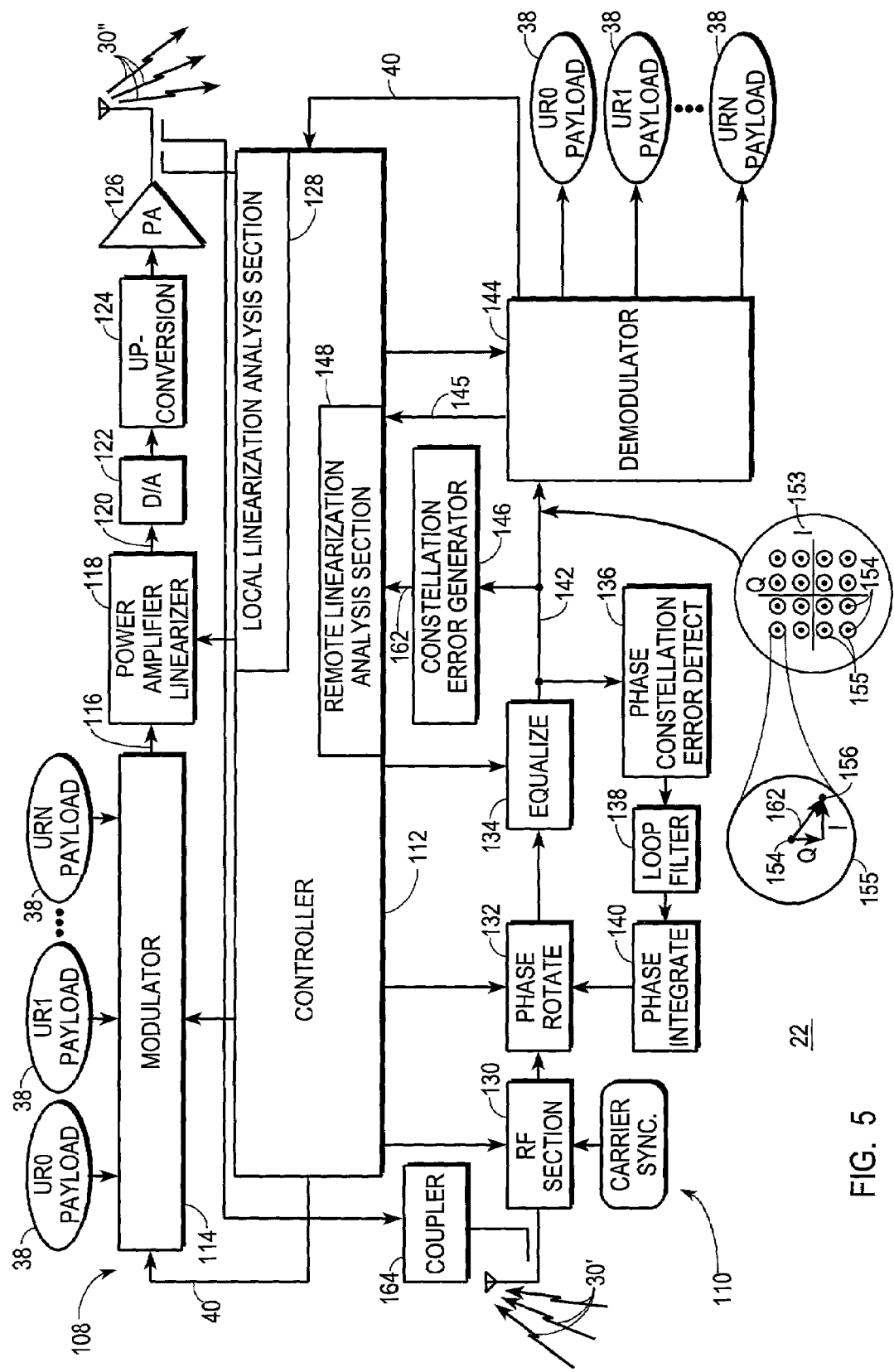
FIG. 5 shows a block diagram of a hub radio configured in accordance with one embodiment of the present invention.

FIG. 5 shows a block diagram of a hub radio 22 configured in accordance with one embodiment of the present invention. For purposes of the present discussion, hub radio 22 has a structure with many similarities to that discussed above for user radio 24. Thus, hub radio 22 includes a transmitter section 108, a receiver section 110, and a controller 112. Transmitter section 108 includes a modulator 114 that produces a modulated data stream 116. Modulator 114 receives system control data 40 from controller 112 and, unlike user radio 24, receives user payload data 38 destined for a variety of different user radios 24.

Modulated data stream 116 is routed to an optional power amplifier linearizer 118. Power amplifier linearizer 118 imposes a locally determined transfer function on modulated data stream 116 and thereby generates a linearized data stream 120 supplied to a digital-to-analog (D/A) converter 122. An analog output from digital-to-analog converter 122 passes to an up-conversion section 124. After combining separate complex signals into a single up-converted analog signal, the output from up-conversion section 124 is amplified in a power amplifier 126. Power amplifier 126 amplifies linearized data stream 120 and generates communication signal 30", which is transmitted to user radios 24 over forward links 26 (FIG. 1) in the assigned time slots 34 (FIG. 2).

Unlike user radios 24, in one embodiment hub radio 22 is locally linearized. Thus, a local linearization analysis section 128, which is depicted in FIG. 5 as a portion of controller 112, receives an input from the output of power amplifier 126 and provides an output to power amplifier linearizer 118. Local linearization analysis section 128 includes the attenuation, down-conversion, demodulation, and other circuits necessary to locally monitor transmitted communication signal 30" for spectral content outside of a predetermined spectral template. In addition, local linearization analysis section 128 provides the processing capabilities to characterize the nonlinear distortion present in transmitted communication signal 30" and to determine a linearizer transfer function that will ameliorate that distortion.

In another embodiment, hub radio 22 may omit power amplifier linearizer 118 and local linearization analysis section 128, and instead rely upon the use of high quality components in the construction of power amplifier 126 to insure a desired degree of power amplifier linearity. Such a high quality, linear power amplifier 126 may be a costly item, but since only one hub radio 22 is used for many user radios 24 in a typical application, the cost of that one power amplifier may be spread over a large quantity of provided communication services to have little overall effect on a system-wide basis.

Receiver section 110 includes an RF section 130, phase rotator 132, adaptive equalizer 134, phase constellation error detector 136, carrier tracking loop filter 138, and phase integrator 140 all coupled together and operating substantially as discussed above for user radio 24. Accordingly, communication signals 30' transmitted from a number of user radios 24 are received and converted into a baseband quadrature constellation point data stream 142 output from adaptive equalizer 134. The assignment of time slots 34 (FIG. 2) which may be in effect from moment to moment defines which parts of data stream 142 apply to which user radios 24. Data stream 142 is supplied to a demodulator 144, which extracts and locally routes the conveyed data. System control data 40 is routed to controller 112 while user data 38 is routed outside hub radio 22 for the purposes of the present discussion. FIG. 5 illustrates separate lines to accommodate data from separate user radios 24. However, those skilled in the art will appreciate that separating such data may not be required. User data 38 from a variety of user radios 24 may be routed to any type of device that further conveys user data 38 to its ultimate destination and consumption point.

Demodulator 144 also provides a data quality signal 145 to controller 112 for use by a remote linearization analysis section 148, discussed below. The data quality signal may, for example, provide an indication of bit error rate (BER), which is readily obtained from decoding circuitry within demodulator 144 in a manner well known to those skilled in the art.

Not discussed above in connection with user radio 24, hub radio 22 includes a constellation error generator 146 having an input adapted to receive baseband quadrature constellation point data stream 142 and having an output coupled to controller 112, and more particularly to remote linearization analysis section 148 of controller 112. Remote linearization analysis section 148 differs from local linearization analysis section 128 because remote section 148 operates upon different parameters extracted from a low signal-to-noise ratio received communication signal 30' than the parameters used by local section 128, which monitors a high signal-to-noise ratio transmitted communication signal 30".

FIG. 5 depicts an exemplary phase point constellation 153 configured similarly to constellation 58 (FIG. 3) discussed above in connection with user radio 24. While FIG. 5 depicts constellation 153 as implementing 16-QAM for convenience, those skilled in the art will appreciate that any type of modulation may be implemented, and that the modulation type and order may be changed from time to time. In constellation 153, ideal constellation points 154 correspond to constellation points 56 (FIG. 3) implemented in transmitter section 46 of user radio 24. In other words, in the absence of noise and distortion, baseband quadrature constellation point data stream 142 would output values that substantially represent ideal constellation points 154. Of course, noise and distortion prevent that from happening. Consequently, circles 155 surrounding ideal constellation points 154 indicate a probability density function depicting a region where actual received constellation points 156 are more likely to be encountered during any given unit interval 42 (FIG. 2).

Figure 6:
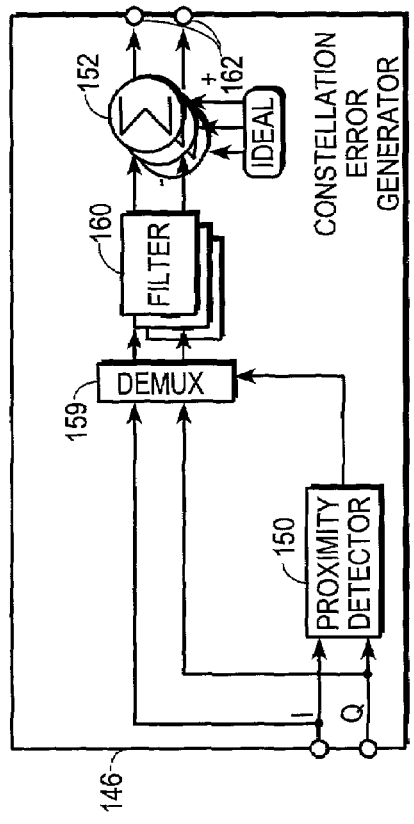
FIG. 6 shows a block diagram of one embodiment of an error vector magnitude generator portion of the hub radio depicted in FIG. 5.

FIG. 6 shows a block diagram of one embodiment of constellation error generator 146. Referring to FIGS. 5 and 6, baseband quadrature constellation point data stream 142, as expressed through I and Q quadrature-phase signals, is input to a proximity detector 150 and to an input of a demultiplexer (DEMUX) 159. In each unit interval 42 (FIG. 2), proximity detector 150 obtains or otherwise determines the nearest ideal constellation point 154 to an actual received constellation point 156 indicated by the I and Q quadrature-phase signals input to generator 146 during each unit interval 42. Outputs from demultiplexer 159 couple to a filter bank 160. Demultiplexer 159 is controlled by an output from proximity detector 150 so that actual received constellation points 156 are routed to a single filter in filter bank 160 associated with the ideal constellation point 154 closest to the received actual constellation point 156. The precise structure of the filters in filter bank 160 is not critical, and may be a simple averaging, integrating, or accumulating circuit. Outputs from filter bank 160 are routed to first inputs of a bank 152 of summing circuits. Each summing circuit in summing circuit bank 152 has a second input adapted to receive data defining the ideal constellation point 154 associated with that summing circuit. Summing circuit bank 152 performs complex subtraction operations to form complex vectors that represent the difference between the filtered or averaged actual received constellation points 156 and their corresponding ideal constellation points 154. The outputs from summing circuit bank 152 are collectively referred to as constellation error generator (CEG) signal 162.

While FIG. 6. depicts constellation error generator 146 as including demultiplexer 159, and separate filters and summing circuits for each ideal constellation point to teach the present invention, those skilled in the art will appreciate that these items are optional. Their functions may alternatively be performed through the execution of appropriate software by controller 112. Furthermore, nothing requires that every actual constellation point 156 be captured to perform remote linearization analysis. Consequently, remote linearization analysis section 148 may be configured to collect as many of actual constellation points 156 and corresponding ideal constellation points 154 as needed, at a rate far less than the communication rate, to perform its analyses. In this implementation, CEG signal 162 is a logical signal generated through the execution of software within remote linearization analysis section 148 of controller 112.

CEG signal 162 characterizes the departure of a received communication signal from the ideal. This departure is due to many factors, the most significant of which is typically noise. A secondary factor has been discovered to be non-linear distortion imposed on communication signals 30' by power amplifiers 74 (FIG. 3) in user radios 24.

CEG signal(s) 162 provides a statistic that is responsive to an expression of the gain and phase error. During any single unit interval 42, this gain and phase error may be an extremely unreliable characterization of true gain and phase error due to a low signal-to-noise ratio. Thus, filter bank 160 averages the gain and phase errors from a multiplicity of unit intervals 42 to ameliorate the influence of noise. While FIG. 6 depicts the use of several filters in filter bank 160 so that a separate filter may be provided for each ideal constellation point 154, those skilled in the art will appreciate that the filtering action provided by filter bank 160 may alternatively be performed in controller 112 for reduced complexity.

Referring back to FIG. 5, hub radio 22 additionally includes an optional coupler 164 positioned between the output of power amplifier 126 and the input of RF section 130. Coupler 164 may include an attenuator and a frequency translation circuit if transmission occurs in a different frequency channel from reception.

Remote linearization analysis section 148 closes a feedback loop that drives non-linear distortion in signals observed in baseband quadrature constellation point data stream 142 to a desired level. It has been discovered that the behavior of CEG signal 162 has good correlation with out-of-band signal energy in communication signal 30' and little sensitivity to other factors, such as multipath, that might otherwise be present. Consequently, CEG signal 162 serves as the basis of one example of a good signal quality statistic that can be derived and observed to determine the distortion in communication signal 30'. However, any non-linearity which may be present in the components in receiver section 110 of hub radio 22 will cause error in such a signal quality statistic. Consequently, the preferred embodiments compensate for non-linearities in hub receiver section 110.

In one embodiment, high signal quality components are used in the construction of receiver section 110 so that receiver non-linearity is held to a minimum. In this embodiment, coupler 164 may be omitted. While such high quality components may be costly, since only one hub radio 22 is provided for numerous user radios 24, the cost factor may be less significant.

In another embodiment, coupler 164 is used to provide a known substantially linear signal to receiver section 110 from time to time for calibration purposes. The signal routed through coupler 164 is known to be linear due to the local linearization performed at hub radio 24 for power amplifier 126. The same signal quality statistic that is monitored for characterizing non-linearities in communication signals 30' is monitored for the calibration signal, and the results may be used to offset later readings obtained from communication signals 30' to compensate for hub receiver section 110 non-linearities. This calibration process may take place while transmitter section 108 is transmitting data to user radios 24 so that no opportunities to provide communication services for users are lost due to the calibration process.

Figure 7:
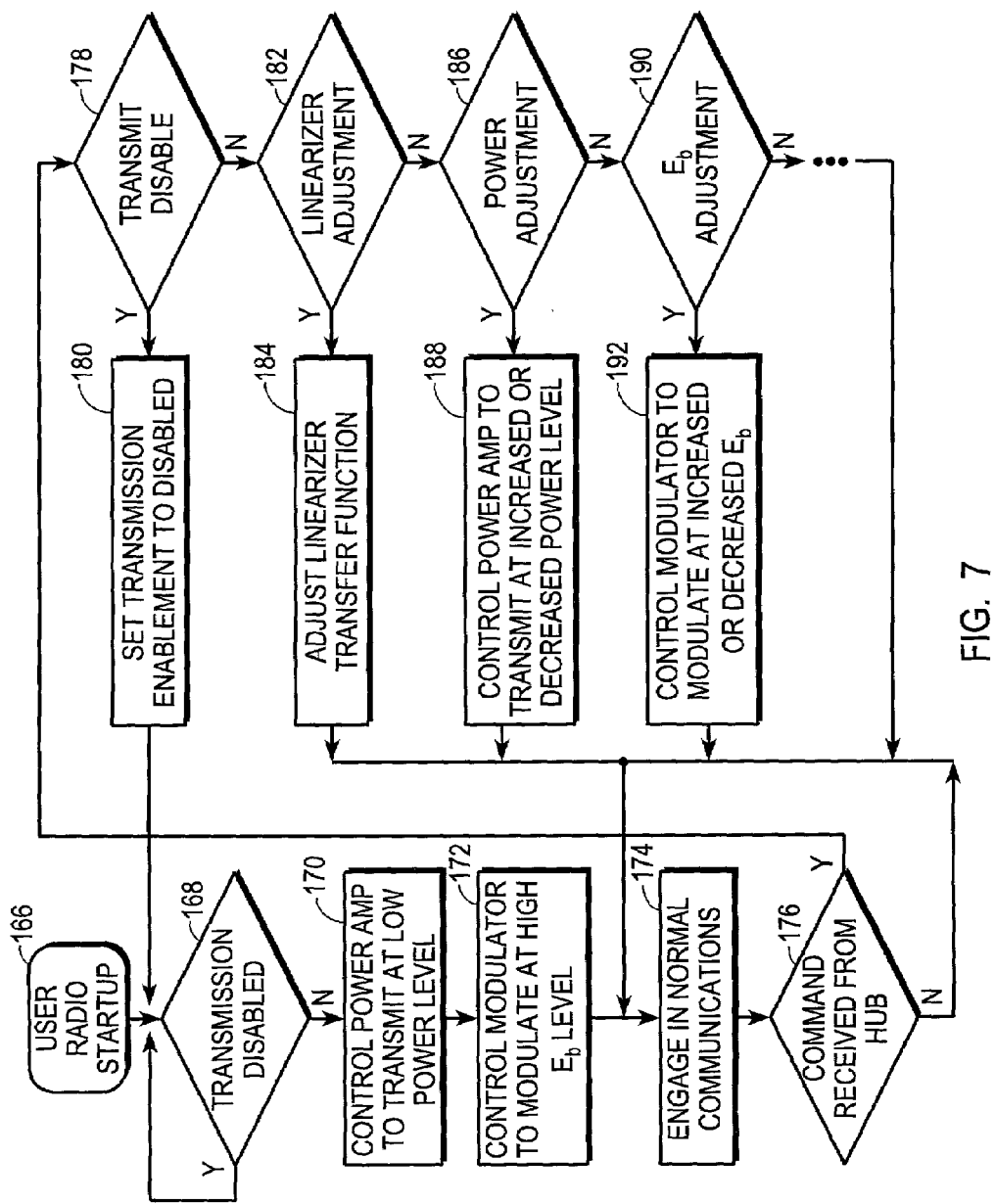
FIG. 7 shows an exemplary flow chart of a process performed by a user radio configured in accordance with the teaching of the present invention.

FIG. 7 shows an exemplary flow chart of a process 166 performed by a user radio 24, and more particularly by controller 48 (FIG. 3) of a user radio 24. Process 166 is performed when user radio 24 enters a start-up mode, such as might occur when user radio 24 is first installed, when user radio 24 is powered-up, when user radio 24 encounters service, or the like.

Process 166 includes an initial query task 168 which determines whether transmission has been disabled. Task 168 may, for example, make its determination by evaluating a flag stored in a non-volatile portion of memory. Transmission may have been disabled in response to a command received from hub radio 22. Such a disable command may have been issued if the user radio 24 was transmitting outside its spectral template, and efforts to enforce compliance with the spectral template were ineffective. If transmission is disabled, program control may be viewed as remaining at task 168 for the purposes of the present discussion. Of course, those skilled in the art will appreciate that this situation represents an error condition which an appropriate error trapping routine may address to let the user know that a malfunction has occurred.

When task 168 determines that transmission has not been disabled, a task 170 is performed to control power amplifier 74 (FIG. 3) so that it will transmit at a relatively low power level. Transmission at a relatively low power level makes compliance with the spectral template more likely because any spectral "skirts" extending beyond an assigned frequency channel will be transmitted at reduced power. Moreover, such relatively low power operation makes operation in natural linear region 80 (FIG. 4) of a typical power amplifier transfer function more likely. As will be discussed below, process 166 continuously operates in a programming loop. The low power level of operation established in an early iteration of this loop in task 170 will be changed to a higher power level of operation in later iterations under normal operating conditions.

After task 170, a task 172 controls modulator 52 (FIG. 3) so that modulation will occur at a relatively high energy per bit ($E_b$) level for the given power level. Those skilled in the art will appreciate that a variety of parameters may be controlled to cause this to happen. For example, a lower modulation order may be selected, symbols may be repeated, or a longer unit interval may be used. In addition, a more robust coding scheme may be employed and/or puncturing may be removed or reduced within an existing coding scheme. This higher $E_b$ level of operation established in an early iteration of process 166 by task 172 will be changed to lower $E_b$ in later iterations under normal operating conditions.

During the initial start-up phase of operating a user radio 24, the relatively high $E_b$ operation will compensate for the relatively low power operation to ensure that communication signal 30' is adequately received by hub radio 22. However, the data rate will likely be undesirably low. In normal operating conditions, future iterations of process 166 will desirably increase power and lower $E_b$ so that linear, spectral-template-compliant operation at the lowest power level which accomplishes a desired data rate results.

After task 172, a task 174 is performed to cause user radio 24 to engage in normal communications. In other words, referring to FIGS. 3 and 7, user payload data 38 and system control data 40 are modulated, linearized, amplified, and transmitted as communication signal 30', and receiver section 44 of user radio 24 is operated to receive and demodulate any communication signals 30" that may be available. The linearization-related activities to be performed by user radio 24 will take place while normal communications are on-going, and particularly while user radio 24 transmits either user payload data 38, system control data 40, or both.

Following task 174, or more precisely while task 174 is ongoing, a query task 176 determines whether receiver section 44 of user radio 24 has received any commands from hub radio 22. Commands represent one form of system control data 40. So long as no commands have been received, program control returns to task 174 to continue engaging in normal communications.

When a command has been received, process 166 progresses to a query task 178 to begin parsing the command. If task 178 determines that a transmit disable command has been received, then a task 180 is performed to set transmission enablement to its disabled state. As discussed above, the transmit disable command may be issued when user radio 24 cannot transmit within the constraints of its spectral template. Following task 180, program control returns to task 168. No further transmissions will emanate from this user radio 24, and the excessive interference that would result from transmitting outside the spectral template will be eliminated. By being able to enforce compliance with the spectral template and by disabling user radios 24 that cannot comply, a hub radio 22 may maintain positive control over the spectrum used by communication system 20 (FIG.

1). Those skilled in the art will appreciate that techniques unrelated to the present invention may be employed to set transmission enablement to the enabled state by a repairman when the spectral compliance problem has been investigated and corrected.

When task 178 fails to detect a transmit disable command, a query task 182 determines whether a linearizer adjustment command has been received. When a linearizer adjustment command has been received, a task 184 is performed to adjust the linearizer transfer function, for example from transfer function 82 to transfer function 84 (FIG. 4) or vice versa. In the preferred embodiment, a linearizer adjustment command is accompanied by a few parameters which represent coefficients to a model used to generate data which define the desired linearizer transfer function. That model may be or approximate the inverse of a model of power amplifier 74. During task 184, controller 48 may apply these coefficients to the model to generate data and store the data in look-up tables within power amplifier linearizer 66. After task 184, program control returns to task 174 to continue engaging in normal communications, but with an adjusted linearization transfer function.

When task 182 fails to detect a linearizer adjustment command, a query task 186 determines whether a power adjustment command has been received. When a power adjustment command has been detected, a task 188 controls power amplifier 74 so that future transmissions from user radio 24 will occur at an increased or decreased power level, as instructed by the command. After task 188, program control returns to task 174 to continue engaging in normal communications, but with future transmissions taking place at a different power level. Following initial start-up, where the power level was set to a relatively low level in task 170, the first power adjustment commands received are likely to be for an increased power level. However, as the linearization process continues and during steady state operation, power adjustment commands may indicate either an increased or decreased power level as may be appropriate for the circumstances.

When task 186 fails to detect a power adjustment command, a query task 190 determines whether an energy per bit ($E_b$) adjustment command has been received. When an $E_b$ adjustment command has been detected, a task 192 controls modulator 52 so that future transmissions from user radio 24 will occur at an increased or decreased $E_b$ level, as instructed by the command. After task 192, program control returns to task 174 to continue engaging in normal communications, but with future transmissions taking place at a different $E_b$ level. Following initial start-up, where the $E_b$ level was set to a relatively high level in task 172, the first $E_b$ adjustment commands received are likely to be for a decreased $E_b$ level. However, as the linearization process continues and during steady state operation, $E_b$ adjustment commands may indicate either an increased or decreased $E_b$ level as may be appropriate for the circumstances.

As indicated by ellipsis in FIG. 7, when task 190 fails to detect an $E_b$ adjustment command, parsing may continue for other commands not critical to the present discussion, with process 166 taking the appropriate actions in the event other commands are detected. In accordance with the preferred embodiments, after acting upon any received commands, program control may return to task 174 to continue engaging in normal communications.

Figure 8:
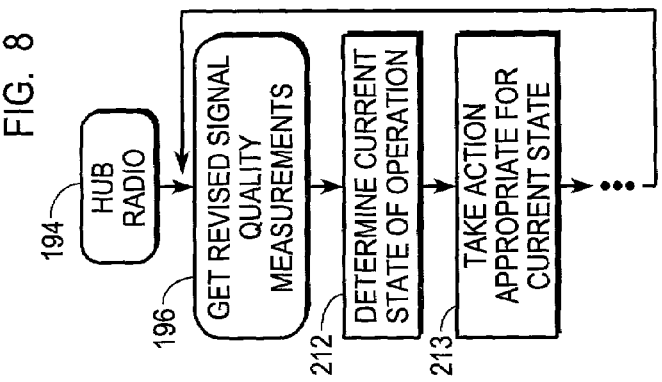
FIG. 8 shows an exemplary flow chart of a process performed by a hub radio configured in accordance with the teaching of the present invention.

FIG. 8 shows an exemplary flow chart of a process 194 performed by a hub radio 22 configured in accordance with the teaching of the present invention. Process 194 is performed by controller 112 (FIG. 5) during a steady state mode of operating hub radio 22. In other words, process 194 operates as a programming loop that continuously repeats while hub radio 22 is operating.

Process 194 includes a sub-process 196 which gets a revised signal quality measurement from which an updated signal quality statistic is formed. As discussed above, in the preferred embodiment CEG signal 162 (FIG. 5) provides a measurement that has been determined to be highly correlated to out-of-band energy for communication signal 30' but non-responsive to multipath and other distortions that may be present in communication signal 30'.

Figure 9:
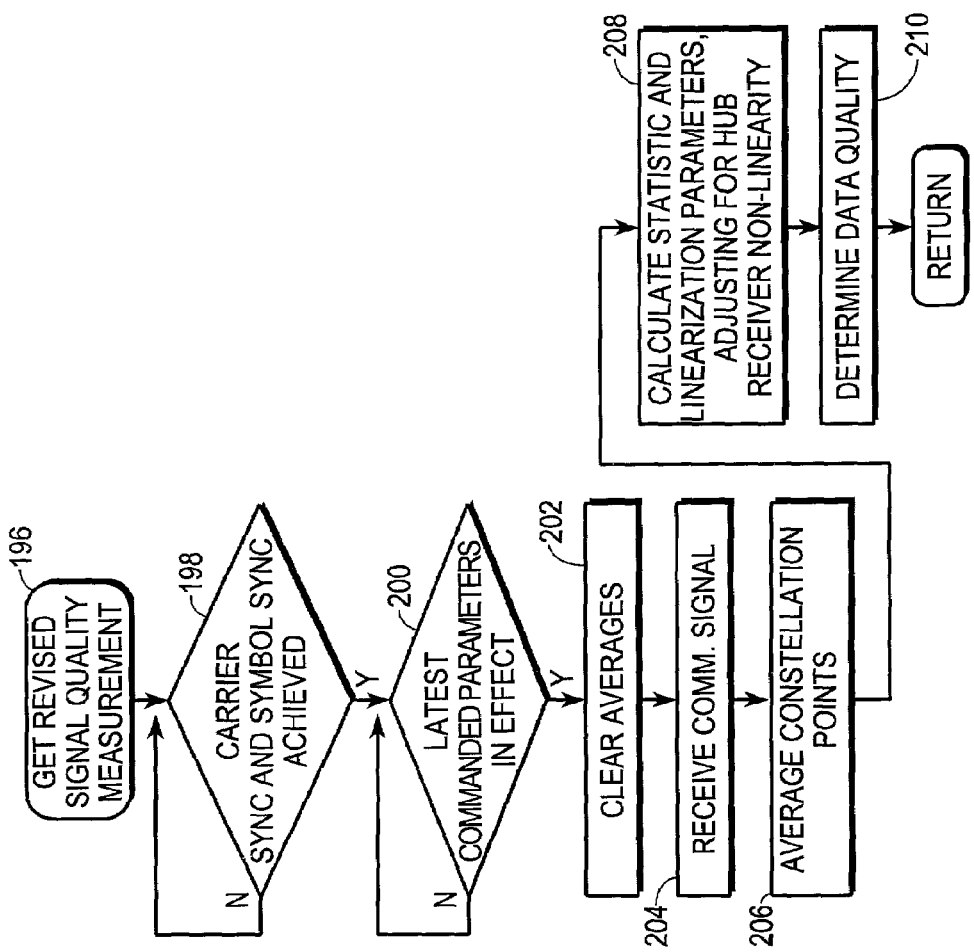
FIG. 9 shows a flow chart of a process performed by one embodiment of the hub radio to get a revised signal quality statistic.

FIG. 9 shows a flow chart of sub-process 196. Referring to FIGS. 5, 6, 8, and 9, process 196 includes a query task 198 which determines whether receiver section 110 has achieved carrier synchronization and symbol synchronization. While CEG signal 162 provides one example of a signal quality measurement from which a quality statistic suitable for characterizing spectral emissions outside a predetermined spectral template may be derived, CEG signal 162 provides its most meaningful results after receiver section 110 is well-synchronized to communication signal 30'. If carrier and symbol synchronization have not been achieved, then program control simply waits at task 198 until synchronization is achieved because signal quality statistics derived from measurements taken before synchronization could lead to unreliable results.

When task 198 detects synchronization, a query task 200 determines whether any previous commanded parameters are in effect. Task 200 may simply insure that a predetermined amount of time has transpired since a previous command was transmitted to the user radio 24 of interest to be sure that the command has been put into effect. Alternatively, task 200 may determine whether a signal acknowledging receipt of and action upon a command has been received from the user radio 24. Program control remains at task 200 until controller 112 is confident that a previously issued command has been acted upon.

When task 200 determines that a previously issued command has been acted upon, a task 202 clears any averages being calculated for the user radio 24 of interest. By clearing the averages, a new averaging or integrating process is initialized and may then begin. Following task 202, a task 204 transpires while receiver section 110 receives communication signal 30', and a task 206 simultaneously integrates, filters, or otherwise averages the actual received constellation points 156 conveyed by baseband quadrature constellation point data stream 142. As discussed above, a significant cause of constellation point error is noise, and the averaging of task 206 is performed for a sufficient duration so that a high likelihood exists that the noise influence has been well ameliorated.

Following sufficient averaging in task 206 to ameliorate noise, a task 208 is performed to calculate the non-linearity characteristics and signal quality statistic. Task 208 first adjusts for hub receiver section 110 non-linearities. As discussed above, a calibration process may be performed from time-to-time at hub radio 22 using a known-linear signal transmitted from hub radio 22 as a received communication signal at hub radio 22. Baseband quadrature phase errors resulting from this known-linear signal will correspond to non-linearities resulting from the operation of receiver section 110 in hub radio 22. Task 208 adjusts the constellation error magnitudes obtained from task 206 by subtracting or otherwise compensating for the constellation error magnitudes recorded from the calibration procedure to obtain a signal quality measurement more responsive to non-linearities of the user radio 24 of interest and less responsive to hub radio 22 non-linearities.

In addition to calculating linearization parameters, the signal quality statistic is further developed by combining individual constellation error components, scaling, offsetting, and the like, so that the resulting signal quality statistic may be compared against one or more predetermined thresholds. Below a lower threshold, high and perhaps excessively high compliance with the spectral template is indicated. Between lower and upper thresholds, compliance with the spectral template is indicated, and above the upper threshold, operation outside the spectral template is indicated.

Following task 208, a task 210 determines the latest indication of data quality. Data quality may be determined by simply monitoring the bit error rate signal 145 from a decoder (not shown) portion of demodulator 98. Following task 210, program control returns to process 194 (FIG. 8).

Referring to process 194 (FIG. 8), after sub-process 196 has been performed to get fresh indications of linearization quality and of data quality, a task 212 then determines a current state of operation in the remote linearization of a user radio 24 of interest. Following task 212, a task 213 is performed to take an action that is appropriate for the current state.

Figure 10:
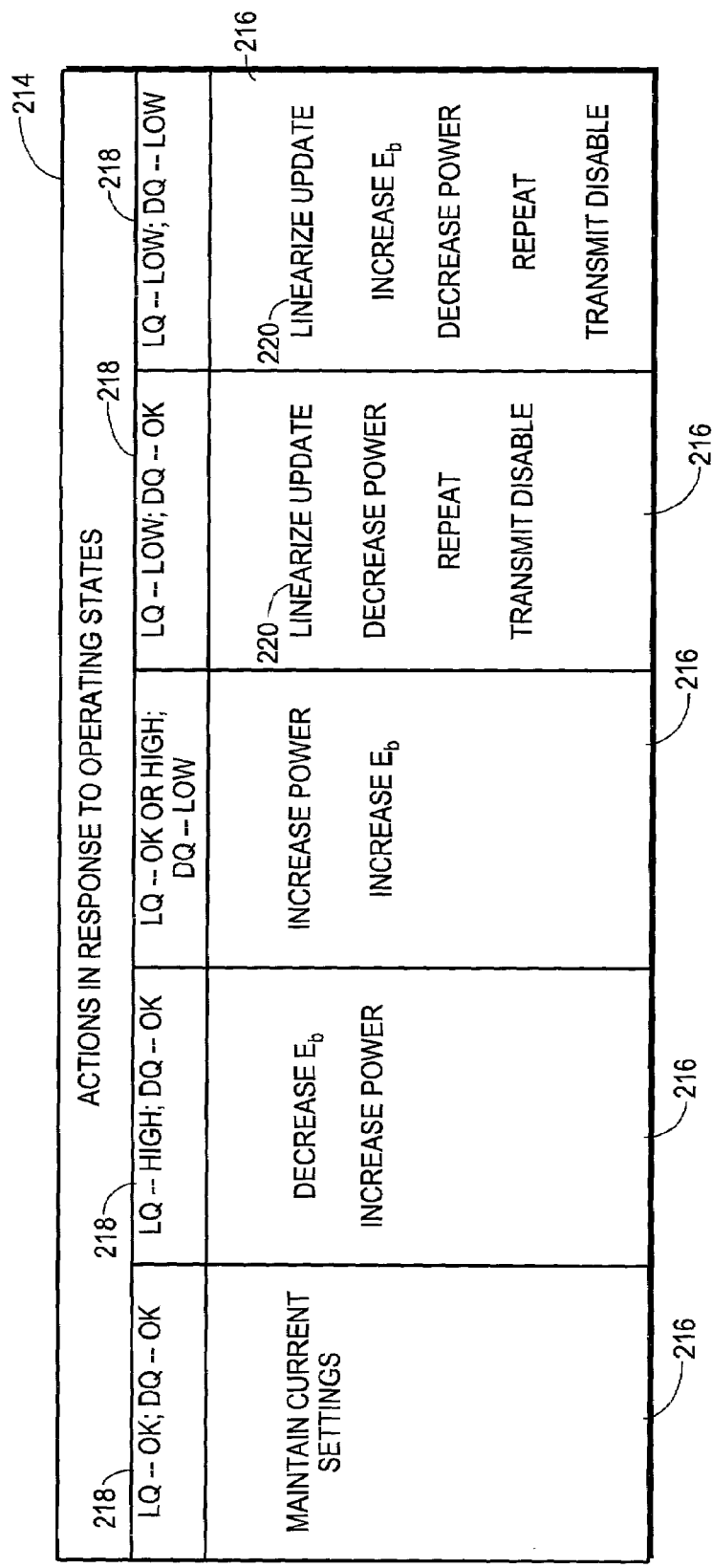
FIG. 10 shows a table presenting various actions that the hub radio may take in accordance with the process of FIG. 8 when operating in various operating states.

FIG. 10 shows a table 214 presenting various actions 216 that hub radio 22 may take in response to various states 218 of operation in the remote linearization of a user radio 24. Table 214 shows an example in which five states are defined. Those skilled in the art will appreciate that table 214 is merely an example of the types of states and actions that may be defined and that different or additional states and actions may be devised for specific applications.

In one state 218, the linearization quality (LQ) obtained above from the operation of sub-process 196 is indicated as being OK, and the data quality (DQ) obtained above from the operation of sub-process 196 is also indicated as being OK. For the purpose of interpreting table 214, an OK linearization quality (LQ) occurs when the signal quality statistic developed in sub-process 196 is between upper and lower thresholds so that spectral template compliance is indicated, but not excessively high compliance. High linearization quality (LQ) corresponds to excessive spectral template compliance, and low linearization quality (LQ) corresponds to non-compliance with a spectral template. When LQ and DQ are both OK, hub radio 22 may simply take an action 216 to maintain the current settings. Such an action may actually amount to taking no action, or a "maintain settings" command may be sent to the user radio 24 of interest to indicate that linearization is being monitored.

In another state 218, LQ is indicated as being high while DQ is OK. In this state 218, hub radio 22 may, if possible, first command a decrease in $E_b$, which should correspond to operating the communication link at a higher data rate. This action 216 should have little or no detrimental influence on LQ, but may diminish DQ. If successful, this action 216 will allow more spectrum to become available for other users. In addition, if a subsequent hub-command-user-response iteration indicates continued operation in this state 218, hub radio 22 may then command an increase in power so that an increase in data rate is then more likely to be successful. The increase in power command may detrimentally affect LQ, but since LQ is high in this state, it may deteriorate to an OK level without any problem being indicated.

In another state 218, LQ is either OK or High, but DQ is low. In this state 218, hub radio 22 may command an increase in power in an attempt to improve DQ. The command to increase power may cause LQ to deteriorate to a low level, in which case a subsequent iteration of the hub-command-user-response cycle will invoke a different state. If the command to increase power does not cause LQ to significantly deteriorate, and a subsequent iteration of the hub-command-user-response cycle continues in this state, then an increase in $E_b$ may be commanded. An increase in $E_b$ is less likely to deteriorate LQ, but is likely to decrease data rate.

In another state 218, LQ is low and DQ is OK. In this state 218, hub radio 22 may perform a linearize update subprocess 220.

Figure 11:
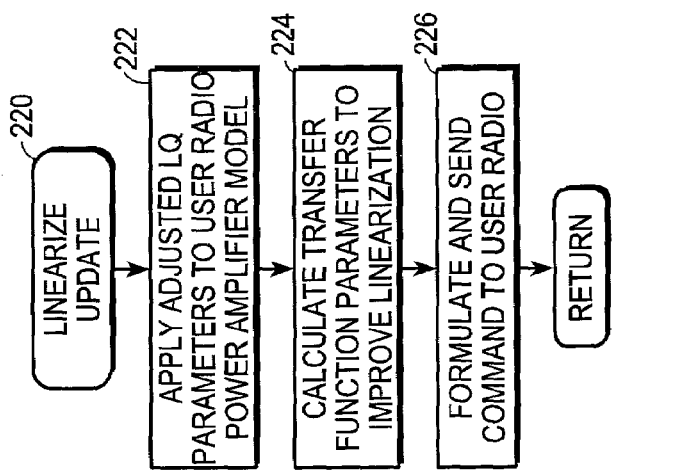
FIG. 11 shows a flow chart of a process performed by one embodiment of the hub radio to update a user radio's linearization.

FIG. 11 shows a flow chart of a linearize update subprocess 220. Sub-process 220 includes a task 222 in which the linearization quality (LQ) measurements are applied to a model of power amplifier 74 for the user radio 24 of interest. The preferred embodiment uses a third-order power amplifier model to achieve acceptable results. However, other power amplifier models known to those skilled in the art, such as a Saleh model or a fifth-order model may also be used. In one alternate embodiment, a variety of different models may be used by hub radio 24, with an appropriate model selection being based upon the identity of the user radio 24 being remotely linearized. In another alternate embodiment, a model for each user radio 24 may be refined in response to a series of hub-command-user-response cycles.

Next, a task 224 is performed to calculate a suitable power amplifier linearizer transfer function that should lead to improved results. Following task 224, a task 226 formulates a linearize adjustment command that is accompanied by coefficients or parameters of the linearizer transfer function determined above in task 224, and task 224 sends the command to the user radio 24 of interest. The command is sent to the user radio 24 of interest via wireless communication over communication signal 30'', (FIG. 1) as system control data 40.

For tasks 224 and 226, constellation error generator 148 (FIG. 5) measures the average difference between actual received constellation points 156 and corresponding ideal constellation points 154. By assuming that these errors are due to power amplifier non-linearities, and by assuming a limited complexity power amplifier mathematical model, the output of the constellation error generator 148 may be used to calculate or estimate the power amplifier model parameters that would generate the observed distortion. Normally, this is a standard curve-fitting procedure. Desirably, the number of power amplifier model parameters is less than the number of unique constellation points. The number of unknowns should be equal to or less than the number of equations.

Once the residual power amplifier gain and phase error has been estimated, an inverse correction is then calculated for application by user-radio linearizer 66 (FIG. 3). It may be possible to solve for the inverse of the error mathematically, depending on the power amplifier model. If that is not convenient, it is always possible to invert the gain error and negate the phase error at multiple different output powers to obtain a numerical approximation to the desired linearization curve. These inversions are performed by most local linearizers and are well known to those skilled in the art.

Referring back to FIGS. 8 and 10, when hub radio 22 has performed the linearize update sub-process 220, a subsequent iteration of the hub-command-user-response cycle will hopefully show improved LQ, in which case task 212 will detect operation in a state 218 which reflects an OK or high LQ level. However, if such a subsequent iteration continues to indicate low LQ but OK DQ, then hub radio 22 may issue a decrease power command in a further attempt to improve the LQ indicator. Linearize update sub-process 220 and decrease power commands may be repeated a predetermined number of times to give the user radio 24 of interest ample opportunity discover settings where transmission in compliance with the spectral template can take place. However, if the predetermined number of repetitions occurs without improving the LQ indicator into at least the OK range, then the transmit disable command may be issued to the user radio 24 of interest. The user radio 24 will then be prevented from future transmissions until the user radio 24 is repaired.

In another state 218, LQ is low and DQ is also low. In this state 218, hub radio 22 may also first perform linearize update sub-process 220 in an attempt to improve the LQ indicator. In conjunction with any linearize adjustment command designed to improve user radio power amplifier linearization, hub radio 22 may issue an increase $E_b$ command to improve DQ. If a subsequent iteration of the hub-command-user-response cycle again returns to the low LQ, low DQ state 218, a decrease power command may be issued in a further attempt to find settings where operation in compliance with the spectral template can take place. If after a predetermined number of repetitions of these actions the LQ continues to indicate a low condition, then the transmit disable command may be issued to prevent the user radio 24 from engaging in future transmissions until the user radio 24 is repaired.

As indicated by ellipsis in FIG. 8, hub radio process 194 may include any number of other tasks not directly relevant to remotely linearizing user radios 24. However, process 194 continually repeats to track changes in user radio 24 power amplifier linearization.

In summary, an improved technique for remote power amplifier linearization is provided. A communication system is provided where a transmitter in a user radio is remotely linearized in response to processing performed in a hub radio. A hub radio is provided that can maintain more positive control over the spectrum used by the user radios with which it communicates. User radios may be commanded to take actions that improve spectral compliance. If spectral compliance is not eventually achieved, user radios may be disabled from transmitting. User radios are provided that can use linearized, lower cost, power amplifiers without requiring demodulation and linearization analysis circuitry to accomplish the linearization. A communication system is provided in which linearization analysis takes place by analyzing a received, noisy, low signal-to-noise ratio, communication signal at a hub radio, and a hub radio is provided which includes linearization analysis circuitry and processing capabilities for a number of user radios so that user radios need not include such circuitry and processing capabilities.

Although the preferred embodiments of the invention have been illustrated and described in detail, it will be readily apparent to those skilled in the art that various modifications may be made therein without departing from the spirit of the invention or from the scope of the appended claims. For example, a communication system in which the present invention is incorporated need not be a point to multipoint system, and it need not implement a TDM communication protocol.

What is claimed is:

1. A communication system having remote power amplifier linearization, said system comprising:
    at least one user radio having a power amplifier linearizer that applies a transfer function to a modulated data stream, is coupled to a power amplifier, and is configured to transmit a communication signal generated by said power amplifier of said user radio; and
    a hub radio configured to receive said communication signal transmitted from said at least one user radio, to generate a signal quality measurement for said communication signal, to formulate commands in response to said signal quality measurement for said communication signal, and to transmit said commands, wherein said one user radio is further configured to adjust said transfer function of said power amplifier linearizer of said user radio in response to one of said commands so that said user radio power amplifier becomes remotely linearized.

2. A communication system as claimed in claim 1 wherein said hub radio is further configured to monitor a parameter of said communication signal received from said user radio at a plurality of points in time and to form said signal quality measurement for said communication signal in response to expressions of said parameter at each of said plurality of points in time to ameliorate the influence of noise.

3. A communication system as claimed in claim 1 wherein:
    said communication system is a digital communication system in which, during each of a series of unit intervals, information is conveyed as a constellation point selected from a constellation of quadrature phase points; and
    said hub radio is configured to form said signal quality measurement from baseband quadrature constellation points.

4. A communication system as claimed in claim 3 wherein said baseband quadrature constellation points are actual received constellation points and said hub radio is further configured to determine ideal constellation points and to calculate differences between said ideal constellation points and said actual received constellation points so that said signal quality measurements are responsive to magnitudes and phases of said differences.

5. A communication system as claimed in claim 1 wherein:
    said hub radio comprises a power amplifier for use in communicating with said user radios; and
    said hub radio power amplifier is locally linearized.

6. A communication system as claimed in claim 1 wherein:
    said communication signals transmitted from said user radio conveys user payload data and system control data; and
    said hub radio is configured to generate said signal quality measurement while said communication signal transmits said user payload data.

7. A hub radio for use in a communication system having remote power amplifier linearization, said hub radio comprising:
    a receiver section configured to receive a wireless communication signal and to generate a signal quality measurement that is responsive to said communication signal;
    a controller configured to estimate a power amplifier linearizer transfer function in response to said signal quality measurement and to formulate a command in response to said estimated power amplifier linearizer transfer function; and
    a transmitter section configured to wirelessly transmit said command.

8. A hub radio as claimed in claim 7 wherein said receiver section monitors parameters of said communication signal at a plurality of points in time and forms said signal quality measurement in response to an expression of said parameters at each of said plurality of points in time to ameliorate the influence of noise.

9. A hub radio as claimed in claim 7 wherein:
said communication signal conveys information during each of a series of unit intervals as a constellation point selected from a constellation of quadrature phase points; and
said receiver section forms said signal quality measurement from baseband quadrature constellation points.

10. A hub radio as claimed in claim 9 wherein said baseband quadrature constellation points are actual received constellation points and at least one of said receiver section and said controller is configured to determine ideal constellation points and calculate differences between said ideal constellation points and said actual received constellation points.

11. A hub radio as claimed in claim 10 wherein said signal quality measurement is responsive to magnitudes of said differences.

12. A hub radio as claimed in claim 7 wherein said transmitter section comprises:
a power amplifier linearizer adapted to apply a transfer function to a modulated data stream and to generate a linearized data stream;
a power amplifier configured to amplify said linearized data stream; and
a local linearization analysis section coupled to said power amplifier linearizer and to said power amplifier to locally linearize said power amplifier.

13. A hub radio as claimed in claim 12 additionally comprising a coupler between an output of said power amplifier and an input of said receiver section for calibrating non-linearity in said receiver section.

14. A user radio for use in a communication system having remote power amplifier linearization, said user radio comprising:
a power amplifier linearizer adapted to apply a transfer function to a modulated data stream and generate a linearized data stream;
a power amplifier configured to amplify said linearized data stream and generate a communication signal;
a receiver section adapted to receive commands from outside said user radio via wireless communication; and
a controller coupled to said receiver and said power amplifier linearizer, said controller being configured to adjust said transfer function in response to said commands so that said power amplifier becomes remotely linearized.

15. In a communication system, a method for remote power amplifier linearization used in generating a communication signal transmitted from a first site for receipt at a second site, said method comprising:
a) receiving said communication signal at said second site;
b) generating a signal quality measurement at said second site, said signal quality measurement being determined from said communication signal received in said receiving activity a);
c) formulating a command at said second site in response to said signal quality measurement;
d) transmitting said command from said second site;
e) receiving said command at said first site;
f) adjusting, at said first site in response to said command, a transfer function applied to a modulated data stream by a power amplifier linearizer;
g) linearizing said modulated data stream in said power amplifier linearizer to generate a linearized data stream;
h) amplifying said linearized data stream in a power amplifier to generate said communication signal; and
i) transmitting said communication signal from said first site.

16. A method as claimed in claim 15 wherein said generating activity b) monitors parameters of said communication signal at a plurality of points in time and forms said signal quality measurement in response to expressions of said parameters at each of said plurality of points in time to ameliorate the influence of noise.

17. A method as claimed in claim 15 wherein:
said communication system is a digital communication system in which, during each of a series of unit intervals, information is conveyed as a constellation point selected from a constellation of quadrature phase points; and
said generating activity b) forms said signal quality measurement from baseband quadrature constellation points.

18. A method as claimed in claim 17 wherein said baseband quadrature constellation points are actual received constellation points and said generating activity b) comprises:
obtaining ideal constellation points; and
calculating differences between said ideal constellation points and said actual received constellation points.

19. A method as claimed in claim 18 wherein said signal quality measurement is responsive to magnitudes and phases of said differences.

20. A method as claimed in claim 15 additionally comprising:
achieving carrier synchronization at said second site prior to said formulating activity c); and
achieving symbol synchronization at said second site prior to said formulating activity c).

21. A method as claimed in claim 15 wherein:
said receiving activity a) receives said communication signal at a receiver section located at said second site;
said method additionally comprises receiving a locally generated calibration signal at said receiver section to determine non-linearity of said receiver;
said method additionally comprises generating said signal quality measurement for said locally generated calibration signal received at said receiver section; and
said formulating activity c) comprises compensating for said non-linearity of said receiver in formulating said command, said compensating activity occurring in response to said signal quality measurement for said locally generated calibration signal.

22. A method as claimed in claim 15 wherein, at said second site, a power amplifier linearizer has an output coupled to a power amplifier input, and said method additionally comprises locally linearizing said second site power amplifier.

23. A method as claimed in claim 15 wherein:
said activities a)–i) form a linearization feedback loop process which repeats to track changes in power amplifier linearization;
during an earlier iteration of said linearization feedback loop process said communication signal is transmitted from said first site at a first power level and a first energy per bit level; and during a later iteration of said linearization feedback loop process said communication signal is transmitted from said first site at a second power level and a second energy per bit level, said second power level being greater than said first power level and said second energy per bit level being less than said first energy per bit level.

24. A method as claimed in claim 23 wherein said later iteration of said linearization feedback loop process occurs after a signal quality statistic derived from signal quality measurement indicates that said communication signal is in compliance with a predetermined spectral template.

25. A method as claimed in claim 15 wherein:
said activities a)–i) form a linearization feedback loop process;
said communication signal conveys user payload data and system control data at different times; and
said linearization feedback loop process takes place while said communication signal conveys user payload data.

26. A method as claimed in claim 15 wherein said communication signal is a first communication signal, said communication system includes a third site that transmits a second communication signal for receipt at said second site, and said method additionally comprises:

receiving said second communication signal at said second site;
generating, at said second site, a second signal quality measurement determined from said second communication signal;
formulating a second command at said second site in response to said second signal quality measurement;
transmitting said second command from said second site;
receiving said second command at said third site;
adjusting, at said third site in response to said second command, a second transfer function applied to a second modulated data stream by a second power amplifier linearizer;
linearizing said second modulated data stream in said second power amplifier linearizer to generate a second linearized data stream;
amplifying said second linearized data stream in a second power amplifier at said third site to generate said second communication signal; and
transmitting said second communication signal from said third site.

* * * * *

UNITED STATES PATENT AND TRADEMARK OFFICE
CERTIFICATE OF CORRECTION

PATENT NO. : 7,088,958 B2 Page 1 of 1
APPLICATION NO. : 09/884000
DATED : August 8, 2006
INVENTOR(S) : MacFarlane Shearer, III et al.

It is certified that error appears in the above-identified patent and that said Letters Patent is hereby corrected as shown below:

In Column 7, line 55, delete "301'"" and insert --30"-- therefor.

In Column 10, line 34, delete "FIG. 6." and insert --FIG. 6-- therefor.

In Column 16, line 35, delete "30"," and insert --30"-- therefor.

Signed and Sealed this

Thirtieth Day of January, 2007

JON W. DUDAS
*Director of the United States Patent and Trademark Office*